United States Patent
Arai

(10) Patent No.: US 8,242,747 B2
(45) Date of Patent: Aug. 14, 2012

(54) CHARGING CONTROL CIRCUIT CAPABLE OF CONSTANT CURRENT CHARGING

(75) Inventor: Kuniaki Arai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 421 days.

(21) Appl. No.: 12/398,449

(22) Filed: Mar. 5, 2009

(65) Prior Publication Data

US 2009/0224726 A1    Sep. 10, 2009

(30) Foreign Application Priority Data

Mar. 6, 2008  (JP) ................ 2008-056426

(51) Int. Cl.
*H02J 7/00*    (2006.01)
*H02J 1/00*    (2006.01)

(52) U.S. Cl. ......... 320/128; 320/127; 320/135; 307/31; 307/52; 307/90

(58) Field of Classification Search .............. 307/66; 363/73; 320/128, 135
See application file for complete search history.

(56) References Cited

U.S. PATENT DOCUMENTS

| | | | |
|---|---|---|---|
| 6,031,357 A * | 2/2000 | Yano et al. .......... | 320/135 |
| 6,433,510 B1 * | 8/2002 | Ribellino et al. ...... | 320/128 |
| 6,828,764 B2 * | 12/2004 | Takimoto et al. ...... | 323/284 |
| 7,069,566 B2 | 6/2006 | Arai | |
| 7,173,890 B2 | 2/2007 | Arai | |
| 7,224,652 B2 | 5/2007 | Arai | |
| 7,821,233 B2 * | 10/2010 | Nate et al. ........... | 320/134 |
| 7,859,223 B2 * | 12/2010 | Gorbold ............ | 320/119 |
| 7,898,217 B2 * | 3/2011 | Nate et al. ........... | 320/134 |
| 2006/0076928 A1 * | 4/2006 | Okamoto et al. ...... | 320/128 |
| 2007/0257639 A1 * | 11/2007 | D'Arrigo et al. ...... | 320/128 |
| 2008/0106918 A1 * | 5/2008 | Shimizu ............. | 363/73 |

FOREIGN PATENT DOCUMENTS

| | | |
|---|---|---|
| JP | 9-74688 | 3/1997 |
| JP | 3331777 | 7/2002 |
| JP | 3570683 | 7/2004 |
| JP | 3570684 | 7/2004 |
| JP | 3597189 | 9/2004 |

(Continued)

OTHER PUBLICATIONS

Blalock, B.J.; Allen, P.E., Circuits and Systems "A low-voltage, bulk-driven MOSFET current mirror for CMOS technology", May 3, 1995. ISCAS '95., 1995 IEEE International Symposium pp. 1-4.*

*Primary Examiner* — Edward Tso
*Assistant Examiner* — Steve T Chung
(74) *Attorney, Agent, or Firm* — Cooper & Dunham LLP

(57) ABSTRACT

In a charging control circuit for controlling charging of a secondary battery, a charging transistor generates a charging current according to a control signal input to a control electrode and outputs the charging current to the secondary battery. The proportional current generation transistor generates and outputs a proportional current proportional to the charging current output by the charging transistor. The constant current charging controller controls the charging transistor so that the proportional current generated by the proportional current generation transistor attains a predetermined first value. The constant current charging controller controls a voltage of a current output terminal of the proportional current generation transistor so that a voltage difference between the voltage of the current output terminal of the proportional current generation transistor and a voltage of a current output terminal of the charging transistor is maintained at a predetermined second value.

13 Claims, 2 Drawing Sheets

FOREIGN PATENT DOCUMENTS

| | | |
|---|---|---|
| JP | 2005-64651 | 3/2005 |
| JP | 3756917 | 1/2006 |
| JP | 3756918 | 1/2006 |
| JP | 3853813 | 9/2006 |
| JP | 2006-309862 | 11/2006 |
| JP | 3961751 | 5/2007 |
| JP | 2007-157267 | 6/2007 |

* cited by examiner

CHARGING CONTROL CIRCUIT CAPABLE OF CONSTANT CURRENT CHARGING

BACKGROUND

1. Technical Field

The present specification describes a charging control circuit, and more particularly, a charging control circuit for charging a secondary battery.

2. Discussion of the Background

Portable devices using a secondary battery as a power supply, such as cellular phones, are now widely used. Such portable devices use a lithium-ion battery having reduced size and weight and a large capacity. However, the lithium-ion battery does not have a mechanism for preventing overcharging, and thereby may pose problems of durability and safety when overcharged.

To address this problem, related-art lithium-ion batteries used as secondary batteries are charged by constant current charging, and then charged by constant voltage charging after a voltage of the secondary battery reaches a predetermined voltage, so that the voltage of the secondary battery does not exceed the predetermined voltage.

FIG. 1 is a circuit diagram of a related-art charging circuit for charging a secondary battery. In a charging circuit 120, when a secondary battery BatR has a low voltage and a voltage of a non-inverting input terminal of an operational amplifier circuit 121 for constant voltage control is not higher than a reference voltage Vref1 generated by a reference voltage generation circuit 123, an output terminal of the operational amplifier circuit 121 has a low level voltage. In this state, an operational amplifier circuit 122 for constant current control controls a charging current to the secondary battery BatR. For example, the operational amplifier circuit 122 controls a gate voltage of a driver transistor M101 so that a voltage decreased by a resistor RD for detecting the charging current is equal to a reference voltage Vref2 generated by the reference voltage generation circuit 123. Thus, a charging current ic becomes a constant current that can be represented by the formula ic=Vref2/rd, in which rd represents a resistance value of the resistor RD.

When the voltage of the secondary battery BatR increases and the voltage of the non-inverting input terminal of the operational amplifier circuit 121 for constant voltage charging reaches the reference voltage Vref1, an output voltage of the operational amplifier circuit 121 increases and the operational amplifier circuit 121 controls a charging current. The operational amplifier circuit 121 controls the gate voltage of the driver transistor M101 to decrease a drain current (e.g., a charging current) of the driver transistor M101 so that the voltage of the secondary battery BatR does not increase further. Accordingly, the voltage decreased by the resistor RD is not higher than the reference voltage Vref2, and an output terminal of the operational amplifier circuit 122 for constant current charging has a low level voltage. Consequently, constant voltage charging is performed at a voltage V that can be represented by the formula V=Vref1×(r121+r122)/r121, in which r121 and r122 represent resistance values of resistors R121 and R122, respectively. At the voltage V, the voltage of the non-inverting input terminal of the operational amplifier circuit 121 is equal to the reference voltage Vref1.

There is an increasing demand for an ability to charge the secondary battery using a USB (universal serial bus) Vbus on a personal computer. However, generally lithium-ion batteries are charged at a charging voltage that ranges from 4.1 V to 4.2 V, whereas USB Vbus voltages are nominally 5.0 V. Therefore, in order to use a Vbus as a power supply for charging the lithium-ion battery, a voltage difference between the Vbus voltage and the secondary battery voltage had to be used effectively.

To address this, a driver transistor and a mirror transistor instead of the resistor RD may be used to detect a charging current. For example, the driver transistor performs charging control while the mirror transistor generates and outputs a proportional current proportional to a current output by the driver transistor, so as to detect a current of the mirror transistor.

However, a ratio between a charging current and a detected current may fluctuate depending on the voltage difference between a power supply voltage Vcc and a voltage of the secondary battery BatR. For example, when the secondary battery BatR has a low voltage, the difference between the power supply voltage Vcc and the voltage of the secondary battery BatR is great, thereby possibly increasing the charging current. By contrast, as the voltage of the secondary battery BatR increases, the charging current may decrease.

In order to stabilize a ratio of the proportional current, there is a technology to cause a voltage between drain and source of the driver transistor to be equal to a voltage between drain and source of the mirror transistor. However, in a desaturation region in which the voltage between drain and source is lower than −1 V, a drain current of the driver transistor may decrease substantially, and therefore a ratio between the drain current of the driver transistor and a drain current of the mirror transistor may decrease.

Consequently, even when the voltage between drain and source of the driver transistor is equal to the voltage between drain and source of the mirror transistor, the charging current may decrease as charging progresses, thereby possibly lengthening charging time.

SUMMARY

This patent specification describes a novel charging control circuit for controlling charging of a secondary battery. One example of a novel charging control circuit includes a charging transistor, a proportional current generation transistor, and a constant current charging controller.

The charging transistor generates a charging current according to a control signal input to a control electrode and outputs the charging current to the secondary battery. The proportional current generation transistor generates and outputs a proportional current proportional to the charging current output by the charging transistor according to the control signal. The constant current charging controller controls the charging transistor so that the proportional current generated by the proportional current generation transistor attains a predetermined first value. The constant current charging controller controls a voltage of a current output terminal of the proportional current generation transistor so that a voltage difference between the voltage of the current output terminal of the proportional current generation transistor and a voltage of a current output terminal of the charging transistor is maintained at a predetermined second value.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EXEMPLARY EMBODIMENTS

Figure 1:
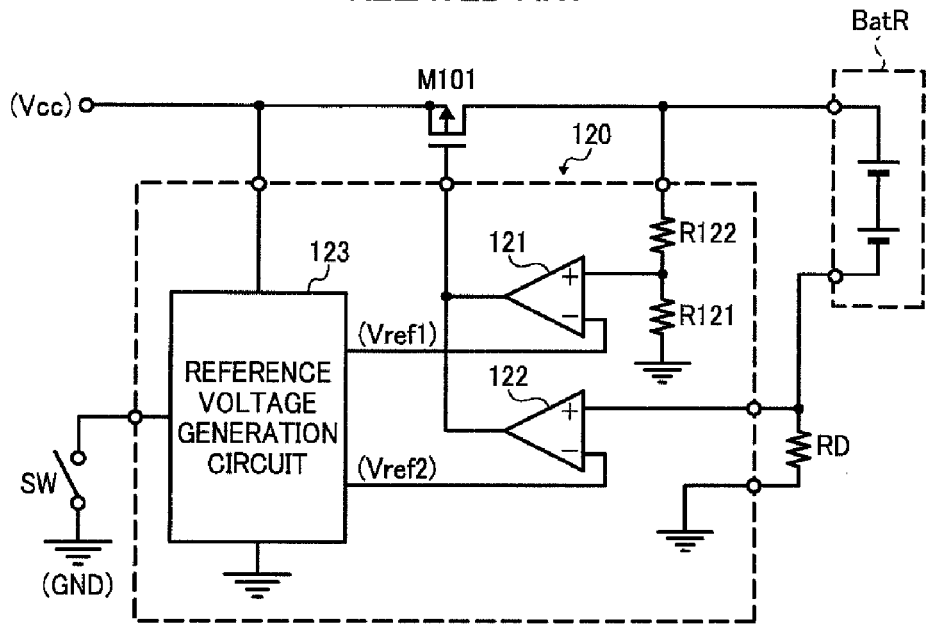
FIG. 1 is a circuit diagram of a related-art charging circuit for charging a secondary battery.

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Figure 2:
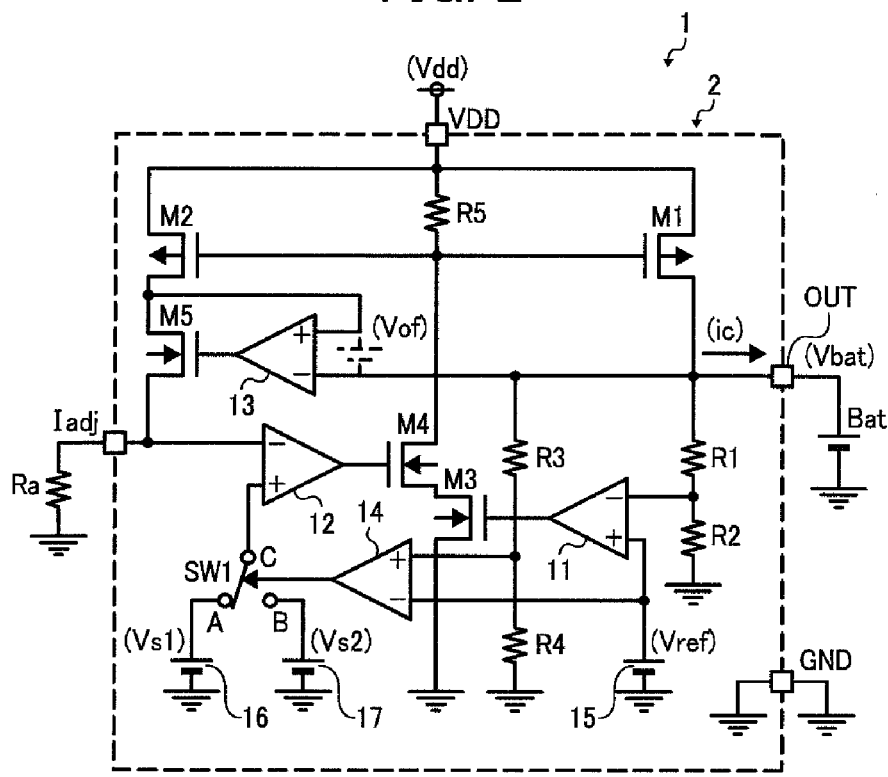
FIG. 2 is a circuit diagram of a charging control circuit according to an exemplary embodiment.

Referring now to the drawings, wherein like reference numerals designate identical or corresponding parts throughout the several views, in particular to FIG. 2, a charging control circuit 1 according to an exemplary embodiment is explained.

FIG. 2 is a circuit diagram of the charging control circuit 1. The charging control circuit 1 includes a charging control IC (integrated circuit) 2 and a resistor Ra.

The charging control IC 2 includes a power supply terminal VDD, a ground terminal GND, a charging current setting terminal Iadj, an output terminal OUT, operational amplifier circuits 11 to 13, a comparator 14, a driver transistor M1, a mirror transistor M2, NMOS (n-channel metal-oxide-semiconductor) transistors M3 to M5, a reference voltage generation circuit 15, a first referential voltage generation circuit 16, a second referential voltage generation circuit 17, a switch SW1, and resistors R1 to R5.

The switch SW1 includes a shared terminal C and terminals A and B.

The charging control circuit 1 charges a secondary battery Bat, such as a lithium-ion battery, connected to the output terminal OUT of the charging control circuit 1. A power supply voltage Vdd is input to the power supply terminal VDD. The ground terminal GND is connected to a ground voltage. The secondary battery Bat is provided between the output terminal OUT and a ground voltage. The resistor Ra is provided between the charging current setting terminal Iadj and a ground voltage.

The driver transistor M1 is used for controlling a charging current and includes a PMOS (p-channel metal-oxide-semiconductor) transistor. The mirror transistor M2 is used for detecting a charging current and includes a PMOS transistor. The reference voltage generation circuit 15 generates and outputs a predetermined reference voltage Vref. The first referential voltage generation circuit 16 generates and outputs a predetermined first referential voltage Vs1. The second referential voltage generation circuit 17 generates and outputs a predetermined second referential voltage Vs2. The driver transistor M1 serves as a charging transistor. The mirror transistor M2 serves as a proportional current generation transistor. The NMOS transistors M4 and M5, the operational amplifier circuits 12 and 13, and the resistor Ra serve as a constant current charging controller. The NMOS transistor M5 serves as a first transistor. The operational amplifier circuit 13 serves as a current controller. The resistor Ra serves as a current-voltage converter. The NMOS transistor M4 and the operational amplifier circuit 12 serve as a control circuit.

A source of the driver transistor M1 and a source of the mirror transistor M2 are connected to the power supply terminal VDD. The pull-up resistor R5 is provided between the power supply terminal VDD and a connection portion connected to a gate of the driver transistor M1 and a gate of the mirror transistor M2. The NMOS transistor M4 and the NMOS transistor M3 are connected in series between the connection portion connected to the gate of the driver transistor M1 and the gate of the mirror transistor M2 and a ground terminal. A drain of the driver transistor M1 is connected to the output terminal OUT. The resistors R1 and R2 are connected in series between the output terminal OUT and a ground terminal. A connection portion connected to the resistor R1 and the resistor R2 is connected to an inverting input terminal of the operational amplifier circuit 11 for constant voltage charging control. The reference voltage Vref is input to a non-inverting input terminal of the operational amplifier circuit 11. An output terminal of the operational amplifier circuit 11 is connected to a gate of the NMOS transistor M3.

The NMOS transistor M5 is provided between a drain of the mirror transistor M2 and the charging current setting terminal Iadj. The drain of the mirror transistor M2 is connected to a non-inverting input terminal of the operational amplifier circuit 13. An inverting input terminal of the operational amplifier circuit 13 is connected to the output terminal OUT. An output terminal of the operational amplifier circuit 13 is connected to a gate of the NMOS transistor M5. An offset voltage Vof is provided in advance between the inverting input terminal and the non-inverting input terminal of the operational amplifier circuit 13. The offset voltage Vof for the non-inverting input terminal of the operational amplifier circuit 13 is higher than the offset voltage Vof for the inverting input terminal of the operational amplifier circuit 13. Alternatively, the offset voltage Vof may be provided inside the operational amplifier circuit 13 or may be applied to the input terminal of the operational amplifier circuit 13 from outside.

An inverting input terminal of the operational amplifier circuit 12 for constant current charging control is connected to the charging current setting terminal Iadj. A non-inverting input terminal of the operational amplifier circuit 12 is connected to the shared terminal C of the switch SW1. An output terminal of the operational amplifier circuit 12 is connected to a gate of the NMOS transistor M4. The first referential voltage Vs1 is input to the terminal A of the switch SW1, and the second referential voltage Vs2 is input to the terminal B of the switch SW1. The resistors R3 and R4 are connected in series between the output terminal OUT and a ground terminal. A connection portion connected to the resistor R3 and the resistor R4 is connected to a non-inverting input terminal of the comparator 14. The reference voltage Vref is input to an inverting input terminal of the comparator 14. An output terminal of the comparator 14 is connected to a control terminal of the switch SW1.

When a low level signal is input to the control terminal of the switch SW1, the shared terminal C is connected to the terminal A. When a high level signal is input to the control terminal of the switch SW1, the shared terminal C is connected to the terminal B. The first referential voltage Vs1 is a referential voltage used for charging current setting when a battery voltage Vbat of the secondary battery Bat is lower than a charging current switch voltage. The second referential voltage Vs2 is a referential voltage used for charging current setting when the battery voltage Vbat of the secondary battery Bat is not lower than the charging current switch voltage.

With the above-described configuration, the mirror transistor M2 generates and outputs a proportional voltage proportional to a current output from the driver transistor M1. A gate length of the mirror transistor M2 is equal to a gate length of the driver transistor M1. However, a gate width of the mirror transistor M2 is smaller than a gate width of the driver transistor M1 according to a current ratio. A voltage of the connection portion connected to the resistor R1 and the resistor R2 is equal to the reference voltage Vref when the battery voltage Vbat reaches a predetermined charging completion voltage. A voltage of the connection portion connected to the resistor R3 and the resistor R4 is equal to the reference voltage Vref when the battery voltage Vbat reaches a predetermined charging current switch voltage which is lower than the charging completion voltage. When the battery voltage Vbat is not higher than a predetermined voltage, charging is performed with a small current for safety. By contrast, when the battery voltage Vbat is not lower than the predetermined voltage, charging can be performed with a great current quickly. The charging current switch voltage serves as the predetermined voltage.

Figure 3:
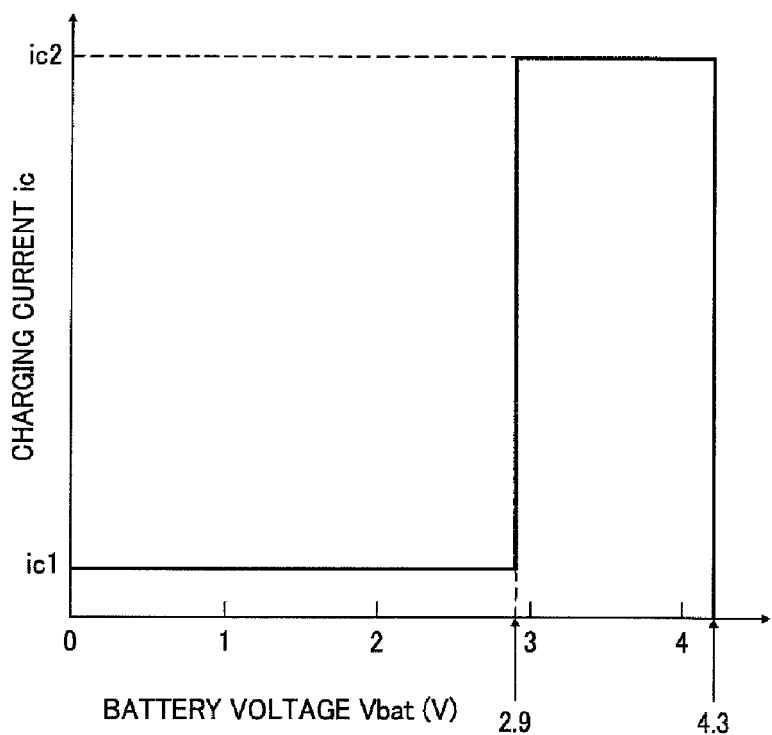
FIG. 3 is a graph illustrating an example of charging characteristics of the charging control circuit shown in FIG. 2.

FIG. 3 is a graph illustrating an example of charging characteristics of the charging control circuit 1 depicted in FIG. 2. Referring to FIG. 3, the following describes charging operations performed by the charging control circuit 1. In FIG. 3, a vertical axis indicates a charging current ic and a horizontal axis indicates a battery voltage Vbat. FIG. 3 illustrates a relation between the charging current ic and the battery voltage Vbat when the charging current switch voltage is 2.9 V and the charging completion voltage is 4.3 V.

As illustrated in FIG. 2, when the battery voltage Vbat is lower than 2.9 V, a voltage of the inverting input terminal of the operational amplifier circuit 11 is lower than the reference voltage Vref. Accordingly, the operational amplifier circuit 11 outputs a high level signal. Consequently, the NMOS transistor M3 is turned on to be conductive, and a source of the NMOS transistor M4 is connected to the ground terminal.

A voltage of the non-inverting input terminal of the comparator 14 is also lower than the reference voltage Vref. Accordingly, the comparator 14 outputs a low level signal, and the shared terminal C of the switch SW1 is connected to the terminal A of the switch SW1. Consequently, the first referential voltage Vs1 is input to the non-inverting input terminal of the operational amplifier circuit 12. The operational amplifier circuit 12 controls voltages of the gates of the driver transistor M1 and the mirror transistor M2, respectively, via the NMOS transistor M4 so that a voltage decreased by the resistor Ra is equal to the first referential voltage Vs1.

In such state, a current value ic1 of the charging current ic is calculated according to a following formula (1).

$$ic1 = K \times (Vs1/ra) \tag{1}$$

In the above formula (1), K represents a ratio between a current of the drain of the driver transistor M1 and a current of the drain of the mirror transistor M2, and ra represents a resistance value of the resistor Ra.

When the battery voltage Vbat is not lower than 2.9 V and lower than 4.3 V, the voltage of the inverting input terminal of the operational amplifier circuit 11 is still lower than the reference voltage Vref. Accordingly, the operational amplifier circuit 11 outputs a high level signal. Consequently, the NMOS transistor M3 is turned on, and the source of the NMOS transistor M4 is connected to the ground terminal.

Further, the voltage of the non-inverting input terminal of the comparator 14 is not lower than the reference voltage Vref. Accordingly, the comparator 14 outputs a high level signal, and the shared terminal C of the switch SW1 is connected to the terminal B of the switch SW1. Consequently, the second referential voltage Vs2 is input to the non-inverting input terminal of the operational amplifier circuit 12. The operational amplifier circuit 12 controls the voltages of the gates of the driver transistor M1 and the mirror transistor M2, respectively, via the NMOS transistor M4 so that a voltage decreased by the resistor Ra is equal to the second referential voltage Vs2.

In such state, a current value ic2 of the charging current ic is calculated according to a following formula (2).

$$ic2 = K \times (Vs2/ra) \tag{2}$$

The current value ic2 is set to a value about ten times as large as the current value ic1.

When the battery voltage Vbat reaches 4.3 V, the voltage of the inverting input terminal of the operational amplifier circuit 11 is equal to the reference voltage Vref, and the operational amplifier circuit 11 outputs a decreased voltage. Accordingly, an impedance between a drain and a source of the NMOS transistor M3 increases to increase a voltage of the source of the NMOS transistor M4. When the voltage of the source of the NMOS transistor M4 increases, a voltage of a drain of the NMOS transistor M4 also increases. Consequently, the voltages of the gates of the driver transistor M1 and the mirror transistor M2 increase and the charging current ic starts decreasing. When the charging current ic decreases, a current of the drain of the mirror transistor M2 also decreases so that a voltage decreased by the resistor Ra is not higher than the second referential voltage Vs2.

As a result, the operational amplifier circuit 12 outputs a high level signal, and the NMOS transistor M4 is turned on to be conductive. Accordingly, the operational amplifier circuit 11 and the NMOS transistor M3 control the driver transistor M1 and the mirror transistor M2. When the charging current ic is lower than a predetermined current value, the driver transistor M1 is turned off to be interrupted. Thus, supply of the charging current ic is stopped and charging is completed.

The following describes operations of the operational amplifier circuit 13. When a voltage difference between a voltage between drain and source Vds of the driver transistor M1 and a voltage between drain and source Vds of the mirror transistor M2 changes, the ratio between the current of the drain of the driver transistor M1 and the current of the drain of the mirror transistor M2 may change due to a channel length modulation effect. To address this, the voltage of the drain of the mirror transistor M2 is controlled to be equal to the voltage of the drain of the driver transistor M1 constantly. The operational amplifier circuit 13 and the NMOS transistor M5 form a circuit for performing such control.

The operational amplifier circuit 13 controls a voltage of the gate of the NMOS transistor M5, so that the voltage of the drain of the mirror transistor M2 input to the non-inverting input terminal of the operational amplifier circuit 13 is equal to the voltage of the drain of the driver transistor M1 input to the inverting input terminal of the operational amplifier circuit 13.

However, as described above, the offset voltage Vof of several tens of mV is provided between the inverting input terminal and the non-inverting input terminal of the operational amplifier circuit 13. Therefore, the voltage of the drain of the mirror transistor M2 is not equal to the voltage of the drain of the driver transistor M1. For example, the voltage of the drain of the mirror transistor M2 is higher than the voltage of the drain of the driver transistor M1 by the offset voltage Vof. In other words, the voltage between drain and source Vds of the mirror transistor M2 is lower than the voltage between drain and source Vds of the driver transistor M1 by the offset voltage Vof.

Figure 4:
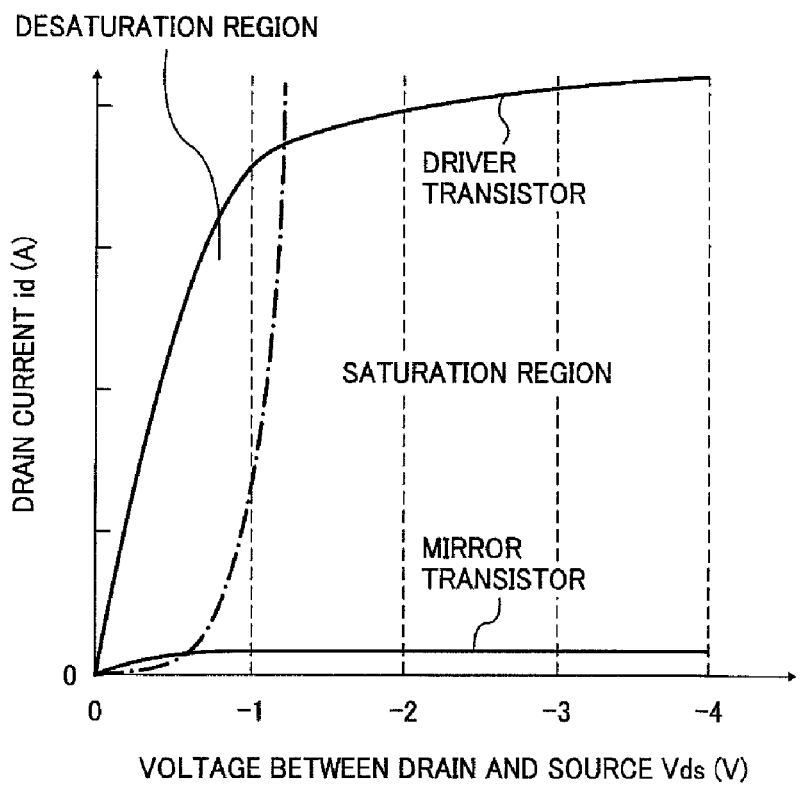
FIG. 4 is a graph illustrating a relation between a voltage between drain and source and a drain current in a PMOS transistor.

FIG. 4 is a graph illustrating a relation between the voltage between drain and source Vds and a drain current id in a PMOS transistor. As shown in FIG. 4, in a saturation region in which the channel length modulation effect is small, the offset voltage Vof of about several tens of mV hardly affects a ratio between a drain current id of the driver transistor M1 and a drain current id of the mirror transistor M2.

By contrast, in a desaturation region in which the voltage between drain and source Vds is lower than −1 V, the channel length modulation effect may become great, and the drain current id of the driver transistor M1 decreases substantially. Accordingly, when the voltage of the drain of the driver transistor M1 is equal to the voltage of the drain of the mirror transistor M2, the ratio between the drain current id of the driver transistor M1 and the drain current id of the mirror transistor M2 decreases to decrease the charging current ic.

To address this, in the charging control circuit 1 depicted in FIG. 2, the voltage between drain and source Vds of the mirror transistor M2 is lower than the voltage between drain and source Vds of the driver transistor M1 by the offset voltage Vof for the operational amplifier circuit 13. Accordingly, the drain current id of the mirror transistor M2 decreases substantially. Namely, even when the drain current id of the driver transistor M1 decreases, the ratio between the drain current id of the driver transistor M1 and the drain current id of the mirror transistor M2 hardly changes. The offset voltage Vof may be set so that the ratio between the drain current id of the driver transistor M1 and the drain current id of the mirror transistor M2 is equal to a predetermined ratio when the battery voltage Vbat reaches the predetermined charging completion voltage.

In the charging control circuit 1 according to the above-described exemplary embodiments, the voltage between drain and source Vds of the mirror transistor M2 is controlled to be a bit lower than the voltage between drain and source Vds of the driver transistor M1. Therefore, even when an operation region of the driver transistor M1 is in the desaturation region, the ratio between the drain current id of the driver transistor M1 and the drain current id of the mirror transistor M2 changes slightly. Accordingly, the charging control circuit 1 can perform constant current charging precisely. Further, even when USB (universal serial bus) Vbus, in which a voltage difference between the power supply voltage Vdd and the charging completion voltage is small, is used as a power supply, the charging control circuit 1 can perform charging control precisely.

As illustrated in FIG. 2, in a charging control circuit (e.g., the charging control circuit 1) according to the above-described exemplary embodiments, a constant current charging controller (e.g., the NMOS transistors M4 and M5, the operational amplifier circuits 12 and 13, and the resistor Ra) controls a voltage of a current output terminal of a proportional current generation transistor (e.g., the mirror transistor M2), so that a voltage difference between the voltage of the current output terminal of the proportional current generation transistor and a voltage of a current output terminal of a charging transistor (e.g., the driver transistor M1) is maintained at a predetermined second value. Thus, even when an operation region of the charging transistor is in a desaturation region, change in a ratio between an output current of the charging transistor and an output current of the proportional current generation transistor can be small. For example, even when a voltage difference between a power supply voltage and a voltage of a secondary battery (e.g., the secondary battery Bat) is lower than 1 V, the charging control circuit can detect a charging current precisely, and thereby can perform constant current charging precisely.

Further, even when USB Vbus, in which a voltage difference between a power supply voltage and a charging completion voltage is small, is used as a power supply, the charging control circuit can perform charging control precisely.

Numerous additional modifications and variations are possible in light of the above teachings. It is therefore to be understood that within the scope of the appended claims, the disclosure of this patent specification may be practiced otherwise than as specifically described herein. For example, elements and/or features of different illustrative embodiments may be combined with each other and/or substituted for each other within the scope of this disclosure and appended claims.

This patent specification is based on Japanese Patent Application No. 2008-056426 filed on Mar. 6, 2008 in the Japan Patent Office, the entire contents of which are hereby incorporated herein by reference.

What is claimed is:

1. A charging control circuit for controlling charging of a secondary battery, the charging control circuit comprising:
   a charging transistor to generate a charging current according to a control signal input to a control electrode and to output the charging current to the secondary battery;
   a proportional current generation transistor to generate and output a proportional current proportional to the charging current output by the charging transistor according to the control signal; and
   a constant current charging controller to control the charging transistor so that the proportional current generated by the proportional current generation transistor attains a predetermined first value,
   the constant current charging controller including an operational amplifier comprising input terminals for receiving input voltages from current output terminals of the charging transistor and the proportional current generation transistor, respectively, and controlling a voltage of the current output terminal of the proportional current generation transistor to maintain a voltage difference between the current output terminal of the proportional current generation transistor and the current output terminal of the charging transistor at a predetermined second value.

2. The charging control circuit according to claim 1, wherein the charging transistor and the proportional current genera transistor comprise MOS transistors of an identical type, respectively.

3. The charging control circuit according to claim 1, wherein the constant current charging controller controls the voltage of the current output terminal of the proportional current generation transistor so that a voltage difference between a voltage of a current input terminal and the voltage of the current output terminal of the proportional current generation transistor is smaller than a voltage difference between a voltage of a current input terminal and the voltage of the current output terminal of the charging transistor by an amount equal to the predetermined second value.

4. The charging control circuit according to claim wherein the constant current charging controller comprises:
   a first transistor comprising a current input terminal connected to the current output terminal of the proportional current generation transistor, and outputting a current according to a signal input to a control electrode; and
   a current controller to control the first transistor so that the voltage difference between the voltage of the current output terminal of the proportional current generation transistor and the voltage of the current output terminal of the charging transistor attains the predetermined second value.

5. The charging control circuit according to claim 4, wherein the constant current charging controller further comprises:
- a current-voltage converter to convert a current output from a current output terminal of the first transistor into a voltage; and
- a control circuit charging transistor and the proportional current generation transistor so that the voltage converted by the current-voltage converter attains a predetermined voltage.

6. The charging control circuit according to claim 4, wherein the current controller comprises the operational amplifier, and the input voltages are applied with an offset voltage provided for the operational amplifier.

7. The charging control circuit according to claim 1, wherein the constant current charging controller controls the charging transistor to maintain the charging current at a predetermined first current value until the voltage of the current output terminal of the charging transistor reaches a predetermined voltage value, and when the voltage of the current output terminal of the charging transistor reaches the predetermined voltage value, increase the charging current to a predetermined second current value which is higher than the predetermined first current value.

8. The charging control circuit according to claim 1, wherein the constant current charging controller controls the charging transistor to maintain the charging current at a predetermined current value while the charging transistor is operating in a desaturation region.

9. The charging control circuit according to claim 1, wherein the constant current charging controller controls the charging transistor so that the charging current is cut off when the voltage of the current output terminal of the charging transistor reaches a predetermined charging completion voltage value.

10. The charging control circuit according to claim 1, wherein the constant current charging controller is connected to the current output terminal of the proportional current generation transistor.

11. The charging control circuit according to claim 2, wherein gates of the charging transistor and the proportional current generation transistor are directly connected, and sources of the charging transistor and the proportional current generation transistor are directly connected.

12. The charging control circuit according to claim 1, wherein a ratio between a current outputted from the charging transistor and a current outputted from the proportional current generation transistor is equal to a predetermined ratio when the voltage of the current output terminal of the charging transistor reaches a predetermined charging completion voltage value.

13. The charging control circuit according to claim 1, wherein a voltage of a current input terminal of the proportional current generation transistor is equal to a voltage of a current input terminal of the charging transistor.

* * * * *